(12) United States Patent
Zhang

(10) Patent No.: US 12,516,834 B1
(45) Date of Patent: Jan. 6, 2026

(54) AIR PURIFIER

(71) Applicant: Baren Home Appliance Technology (Dongguan) Co., Ltd., Dongguan (CN)

(72) Inventor: Tieniu Zhang, Xixia (CN)

(73) Assignee: Baren Home Appliance Technology (Dongguan) Co., Ltd., Dongguan (CN)

( * ) Notice: Subject to any disclaimer, the term of this patent is extended or adjusted under 35 U.S.C. 154(b) by 0 days.

(21) Appl. No.: 19/169,574

(22) Filed: Apr. 3, 2025

(30) Foreign Application Priority Data

Nov. 1, 2024 (CN) .......................... 202411551270.1

(51) Int. Cl.
| | |
|---|---|
| *F24F 8/10* | (2021.01) |
| *F24F 8/108* | (2021.01) |
| *F24F 13/20* | (2006.01) |
| *F24F 3/16* | (2021.01) |
| *F24F 8/80* | (2021.01) |
| *F24F 13/06* | (2006.01) |
| *F24F 13/08* | (2006.01) |

(52) U.S. Cl.
CPC .............. *F24F 8/108* (2021.01); *F24F 13/20* (2013.01); *B01D 2247/12* (2013.01); *F24F 3/16* (2013.01); *F24F 8/10* (2021.01); *F24F 8/80* (2021.01); *F24F 13/06* (2013.01); *F24F 13/08* (2013.01); *F24F 2013/205* (2013.01)

(58) Field of Classification Search
CPC .... F24F 8/108; F24F 13/20; F24F 3/16; F24F 8/10; F24F 8/80; F24F 13/06; F24F 13/08; F24F 2013/205; B01D 2247/12
See application file for complete search history.

(56) References Cited

U.S. PATENT DOCUMENTS

| | | | |
|---|---|---|---|
| 4,731,101 A * | 3/1988 | Kanda ....................... | B04C 5/10 55/472 |
| 5,641,343 A * | 6/1997 | Frey ..................... | B01D 46/521 55/330 |
| 11,262,091 B2 * | 3/2022 | Kim ......................... | F24F 11/52 |

(Continued)

FOREIGN PATENT DOCUMENTS

| | | | | |
|---|---|---|---|---|
| CN | 105091125 A | * | 11/2015 | ............ F24F 13/062 |
| CN | 105091305 A | * | 11/2015 | .............. F24F 13/32 |

(Continued)

OTHER PUBLICATIONS

Epo translation of CN114526534 (Year: 2022).*
Epo translation of CN116147121 (Year: 2023).*

*Primary Examiner* — Stephen Hobson

(57) ABSTRACT

An air purifier includes a lower housing, a surface thereof is provided with air inlets, and an upper part thereof extends inwards to form an annular first guide wall; a bracket, an inner surface of the filter element, and a bottom wall of the lower housing together enclose an air inlet channel; an upper housing, installed on the lower housing, and a top of the upper housing is provided with air outlets; a wind wheel, rotatably arranged inside the upper housing and coaxially arranged with the air inlet channel; the upper housing, the first guide wall, and the bracket together enclose an air outlet channel; the air enters the lower housing from the air inlets and is filtrated by the filter element, then enters the air inlet channel, then enters into the air outlet channel through the communication holes, and expels out of the air outlets.

3 Claims, 5 Drawing Sheets

(56) References Cited

U.S. PATENT DOCUMENTS

| | | | |
|---|---|---|---|
| 11,752,461 B2* | 9/2023 | Jeon | F24F 13/28 55/482 |
| 12,044,429 B2* | 7/2024 | Lee | B01D 46/4254 |
| 12,259,155 B2* | 3/2025 | Tang | F24F 13/085 |
| 2006/0201119 A1* | 9/2006 | Song | B01D 53/007 55/471 |
| 2011/0236229 A1* | 9/2011 | Fitton | F04F 5/16 55/471 |
| 2015/0231542 A1* | 8/2015 | Wennerstrom | F24F 13/28 55/356 |
| 2016/0238037 A1* | 8/2016 | Peet | F04D 25/08 |
| 2017/0122583 A1* | 5/2017 | Lee | F24F 6/04 |
| 2017/0122596 A1* | 5/2017 | Lee | F24F 11/30 |
| 2017/0246581 A1* | 8/2017 | Jung | F24F 8/10 |
| 2017/0248153 A1* | 8/2017 | Park | F04D 29/703 |
| 2018/0001248 A1* | 1/2018 | Jung | B01D 46/2411 |
| 2019/0264948 A1* | 8/2019 | Jung | A61L 2/22 |
| 2020/0224892 A1* | 7/2020 | Yang | F24F 1/029 |
| 2020/0298160 A1* | 9/2020 | Jeon | B01D 46/58 |
| 2020/0298165 A1* | 9/2020 | Kang | B01D 46/24 |
| 2021/0215382 A1* | 7/2021 | Yoon | F26B 25/02 |
| 2021/0381518 A1* | 12/2021 | Horton | F04D 25/10 |
| 2022/0032222 A1* | 2/2022 | Park | B01D 46/42 |
| 2022/0154953 A1* | 5/2022 | Herskovitz | F24F 13/081 |
| 2022/0178561 A1* | 6/2022 | Oram | F24F 6/04 |
| 2022/0184540 A1* | 6/2022 | Park | F24F 3/056 |
| 2022/0184542 A1* | 6/2022 | Kim | F24F 8/108 |
| 2022/0184543 A1* | 6/2022 | Choi | B01D 46/0049 |
| 2022/0218861 A1* | 7/2022 | Chao | B01D 46/12 |
| 2022/0333796 A1* | 10/2022 | Tang | F24F 3/16 |
| 2023/0115276 A1* | 4/2023 | Chen | B01D 46/76 95/273 |
| 2023/0175721 A1* | 6/2023 | Kim | F24F 13/28 55/471 |
| 2023/0221019 A1* | 7/2023 | Wesley | F24F 8/10 |
| 2023/0280055 A1* | 9/2023 | Gray | A47G 7/02 95/273 |
| 2024/0042384 A1* | 2/2024 | Smith | B01D 46/10 |
| 2024/0053033 A1* | 2/2024 | Yang | F24F 13/24 |
| 2024/0426489 A1* | 12/2024 | Chen | F24F 13/20 |

FOREIGN PATENT DOCUMENTS

| | | | | |
|---|---|---|---|---|
| CN | 105465893 A | * | 4/2016 | F24F 8/158 |
| CN | 206247513 U | | 6/2017 | |
| CN | 108561974 A | * | 9/2018 | F24F 8/50 |
| CN | 111457490 A | * | 7/2020 | F24F 8/20 |
| CN | 113465160 A | * | 10/2021 | F24F 13/28 |
| CN | 113531746 A | * | 10/2021 | F24F 8/108 |
| CN | 113587329 A | * | 11/2021 | B01D 46/645 |
| CN | 113739316 A | * | 12/2021 | F24F 13/28 |
| CN | 216080227 U | | 3/2022 | |
| CN | 111156622 B | * | 4/2022 | F24F 11/52 |
| CN | 114484685 A | * | 5/2022 | F24F 8/22 |
| CN | 114526534 | * | 5/2022 | |
| CN | 114526534 A | * | 5/2022 | F24F 8/133 |
| CN | 216744764 U | * | 6/2022 | F24F 8/22 |
| CN | 114777244 A | * | 7/2022 | F24F 13/00 |
| CN | 217022134 U | * | 7/2022 | |
| CN | 115111687 A | * | 9/2022 | F24F 13/24 |
| CN | 115264702 A | * | 11/2022 | F24F 6/10 |
| CN | 115435488 A | * | 12/2022 | F24F 8/108 |
| CN | 115493233 A | * | 12/2022 | F24F 11/89 |
| CN | 115614875 A | * | 1/2023 | F24F 6/04 |
| CN | 116147121 | * | 3/2023 | |
| CN | 116067001 A | * | 5/2023 | F24F 13/1426 |
| CN | 116105286 A | * | 5/2023 | F24F 8/108 |
| CN | 116147121 A | * | 5/2023 | F24F 8/80 |
| CN | 219141000 U | * | 6/2023 | A47L 11/282 |
| CN | 219693539 U | | 9/2023 | |
| CN | 117073117 A | * | 11/2023 | F24F 8/108 |
| CN | 117989160 A | * | 5/2024 | F04D 29/703 |
| CN | 118935586 A | * | 11/2024 | F24F 13/10 |
| CN | 117804022 B | * | 12/2024 | F21V 33/0088 |
| CN | 119146457 A | * | 12/2024 | F24F 13/28 |
| CN | 119333917 A | * | 1/2025 | F24F 13/28 |
| CN | 119353748 A | * | 1/2025 | F24F 13/081 |
| CN | 111868453 B | * | 8/2025 | F24F 13/20 |
| KR | 102011030 B1 | * | 8/2019 | F24F 3/16 |
| WO | WO-2020141308 A1 | * | 7/2020 | F24F 6/043 |
| WO | WO-2022061454 A1 | * | 3/2022 | B01D 46/0015 |
| WO | WO-2024101546 A1 | * | 5/2024 | F24F 13/082 |

\* cited by examiner

AIR PURIFIER

FIELD OF THE INVENTION

The present disclosure relates to the technical field of air purifying devices, particularly, to an air purifier.

BACKGROUND OF THE INVENTION

In the air that people breathe, there are sometimes pollutants such as PM2.5, dust, pollen, formaldehyde, bacteria, and allergens. By purifying the air with an air purifier, the air quality can be improved, and the human body can reduce the inhalation of the above pollutants. Specifically, an air purifier refers to an air purifying device that can adsorb, decompose, or transform various air pollutants.

In the existing air purifiers, the airflow inside the air purifier requires the guide members mounted therein to direct the flow direction. For example, in the Chinese utility model patent with the publication number CN219693539U, a guide seat for guiding the air current is installed inside the purifier. The upwardly extending air supply channel formed by the guide seat allows the air current to flow out upwards. However, this existing air purifier has a large number of components, resulting in a relatively low installation efficiency. In addition, the motors in the existing air purifiers are all installed on the wind wheels to drive the wind wheels to rotate. Therefore, the motors occupy a large space, which will cause an increase in the volume of the air purifier.

SUMMARY OF THE INVENTION

The object of the present disclosure is to provide an air purifier, aiming to solve the technical problems in the prior art, such as a large number of components, relatively low installation efficiency, and a large space occupied by the motor.

To achieve the object, the disclosure provides the air purifier, which includes:

A lower housing, the surface thereof is provided with a plenty of air inlets, and the interior thereof is mounted with an annular filter element extending in the vertical direction, and the upper part thereof extends inwards to form an annular first guide wall;

a bracket, located at the upper end of the filter element; the bracket, the inner surface of the filter element, and the bottom wall of the lower housing together enclose an air inlet channel, the bracket is provided with a plenty of communication holes;

a motor bracket, a driving motor is arranged thereon, a number of through holes are provided on the periphery of the motor bracket around the driving motor; the middle part of the motor bracket is recessed downward to form an installation position, the driving motor is placed at the installation position;

an upper housing, installed on the lower housing, and the top of the upper housing is provided with a plenty of air outlets; and a wind wheel, rotatably arranged inside the upper housing and coaxially arranged with the air inlet channel; the upper housing, the first guide wall, and the bracket together enclose an air outlet channel;

the motor is used to drive the wind wheel to rotate, the air inlet channel is communicated with the air outlet channel through the communication holes, and the air outlet channel is communicated with the air outlets, both ends of the through holes are communicated with the air outlet channel; when the wind wheel rotates, the air enters the lower housing from the air inlets, then is filtrated by the filter element, and enters the air inlet channel, then the air in the air inlet channel is driven by the wind wheel to enter into the air outlet channel through the communication holes, and expel out of the air outlets.

Optionally, a second guiding wall is provided on the bottom of the wind wheel, the second guide wall is in a ring shape, arranged around the circumferential direction of the wind wheel, and gradually inclines upward in the direction from its inner ring to the outer ring.

Optionally, the second guide wall has an arc-shaped surface that protrudes inwards.

Optionally, the first guide wall extends toward the central direction of the lower housing and gradually slopes downwards; and the first guide wall is designed to have the same inclination direction and curvature as the second guide wall.

Optionally, the radian of the first guide wall is $30 \leq \alpha \leq 45$.

Optionally, a third guide wall is provided on the top of the wind wheel, and gradually slopes upwards from the center of the wind wheel to the outside; several blades are arranged between the third guide wall and the second guide wall, Optionally, the bottom surface of the first guide wall is fixed with the bracket through fasteners; the bottom end of the first guide wall abuts against the upper surface of the bracket.

Optionally, a stop rib extends upward from the upper surface of the bracket; the outer diameter of the stop rib is smaller than the inner diameter of the first guide wall.

Optionally, the first guide wall can be integrally formed with the lower housing.

Optionally, an annular groove is formed on the upper surface of the lower housing, and an annular protrusion is provided on the lower surface of the upper housing; the annular protrusion can be inserted into the annular groove and connected through fasteners.

Compared with the prior art, One or more of the above technical solutions in the air purifier provided by the embodiments of the disclosure have at least one of the following technical effects: When the wind wheel rotates, the air can enter the lower housing through the air inlet, then be filtered by the filter element and enter the air inlet channel. Under the drive of the wind wheel, the air in the air inlet channel can, enter the air outlet channel through the communication hole and be discharged from the air outlet. Specifically, since the lower housing, the first guide wall, and the bracket in the disclosure enclose the air outlet channel, the air purifier in the disclosure does not need to additionally install a guide seat inside the housing like the structure in the prior art. In addition, by setting a motor bracket with a recessed installation position, the volume of the air purifier can be reduced. Therefore, the air purifier in the disclosure can reduce the number of components, save production costs, improve production efficiency, and reduce the volume.

BRIEF DESCRIPTION OF THE DRAWINGS

To more clearly illustrate the technical solutions in the embodiments of the disclosure, the following will briefly introduce the drawings that need to be used in the description of the embodiments or the prior art. Obviously, the drawings described below are only some embodiments of the disclosure. For those of ordinary skill in the art, other drawings can also be obtained based on these drawings without any creative effort.

Figure 1:
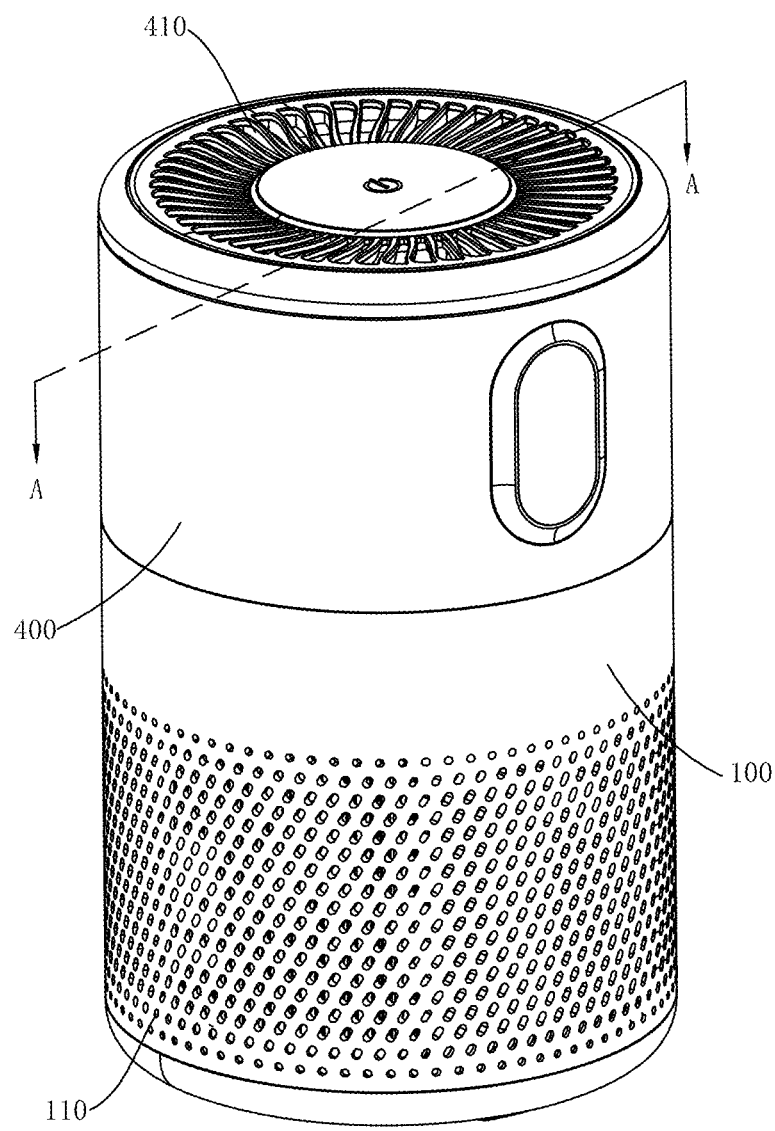
FIG. 1 is a perspective view of the air purifier in the disclosure.

The reference number:

The lower housing 100, the air inlet 110, the first guide wall 120, the annular groove 130; the filter element 200, the bracket 300, the communication hole 310, the stop rib 320, the upper housing 400, the air outlet 410, the annular protrusion 420, the wind wheel 500, the second guide wall 510, the third guide wall 520, the blade 530, the air inlet channel 600; the air supply channel 700, the motor bracket 800, the drive motor 810, the through hole 820, the installation position 830.

DETAILED DESCRIPTION OF ILLUSTRATED EMBODIMENTS

The embodiment of the present invention is described in detail below, and an example of the embodiment is shown in the attached drawings, where the same or similar label from beginning to end represents the same or similar element or element with the same or similar function. The following embodiments described by reference to the attached drawings are exemplary and are intended to be used to explain the embodiments of the present invention, and can not be understood as limiting the present invention.

In the description of the embodiment of the present invention, it needs to be understood that the azimuth or position relation indicated in the term "length", "width", "upper", "lower", "front", "rear", "left", "right", "vertical", "horizontal", "top", "bottom", "inside", "outside" and so on is based on the azimuth or position relation shown in the attached figure, only for the convenience of describing the embodiment and simplifying the description of the present invention, rather than indicating or implying that the device or element must have a specific orientation, construction and operation with a specific orientation, so it can not be understood as a restriction on the present invention.

Furthermore, the terms "first" and "second" are used only for descriptive purposes and can not be understood as indicating or implying relative importance or implicitly indicating the number of technical features indicated. Thus, the qualification of "first" and "second" features may include one or more of them explicitly or implicitly. In the description of the embodiment of the present invention, the meaning of "multiple" is two or more, unless otherwise specified.

In the embodiments of the invention, unless otherwise clearly specified and defined, the terms, "installed", "connected", or "fixed" should be generally understood, for example, a fixed connection, or a removable connection, a mechanical connection or an electrical connection, or a direct connection or an indirect connection through an intermediate media, or a connection within two elements or the interaction of two elements. For those ordinary skilled in the art, the specific meaning of the above terms in the embodiment of the present invention may be understood under specific circumstances.

As shown in FIGS. 1-6, the disclosure provides an air purifier, which includes a lower housing 100, a bracket 300, an upper housing 400, and a wind wheel 500.

Among them, the surface of the lower housing 100 is provided with a plenty of air inlets 110, the interior thereof is mounted with an annular filter element 200 extending in the vertical direction, and the upper part thereof extends inwards to form an annular first guide wall 120. The bracket 300 is located at the upper end of the filter element 200. The bracket 300, the inner surface of the filter element 200, and the bottom wall of the lower housing 100 together enclose an air inlet channel 600. The bracket 300 is provided with a plenty of communication holes 310. The upper housing 400 is installed on the lower housing 100, and the top of the upper housing 400 is provided with a plenty of air outlets 410. The wind wheel 500 is rotatably arranged inside the upper housing 400 and coaxially arranged with the air inlet channel 600. The upper housing 400, the first guide wall 120 and the bracket 300 together enclose an air outlet channel 700. The air inlet channel 600 is communicated with the air outlet channel 700 through the communication holes 310, and the air outlet channel 700 is communicated with the air outlet 410.

In addition, in the upper housing 400 in the disclosure, a motor bracket 800 is also provided. A driving motor 810 is arranged on the motor bracket 800 and is used to drive the wind wheel 500 to rotate. Several through holes 820 are provided on the periphery of the motor bracket 800 around the driving motor 810. Both ends of each through hole 820 are communicated with the air outlet channel 700. The middle part of the motor bracket 800 is recessed downward to form an installation position 830. The driving motor 810 is placed at the installation position 830. The recessed installation position 830 can reduce the overall height of the air purifier and save space.

It can be understood that when the wind wheel 500 rotates, the air enters the lower housing 100 from the air inlets 110, then is filtrated by the filter element 200, enters the air inlet channel 600, then enters into the air outlet channel 700 through the communication holes 310 driven by the wind wheel 500, and expels out of the air outlets 410. Specifically, Since the upper housing 400, the first guide wall 120 and the bracket 300 in the disclosure enclose to form the air outlet channel 700, the air purifier of the disclosure does not need to additionally install a part like the guide seat inside the housing as the prior art. In addition, by setting the motor bracket 800 with the recessed installation position 830, the volume of the air purifier can be reduced. Therefore, it can reduce the number of parts in the air purifier in the disclosure, save production costs, improve production efficiency, and reduce the volume.

Figure 2:
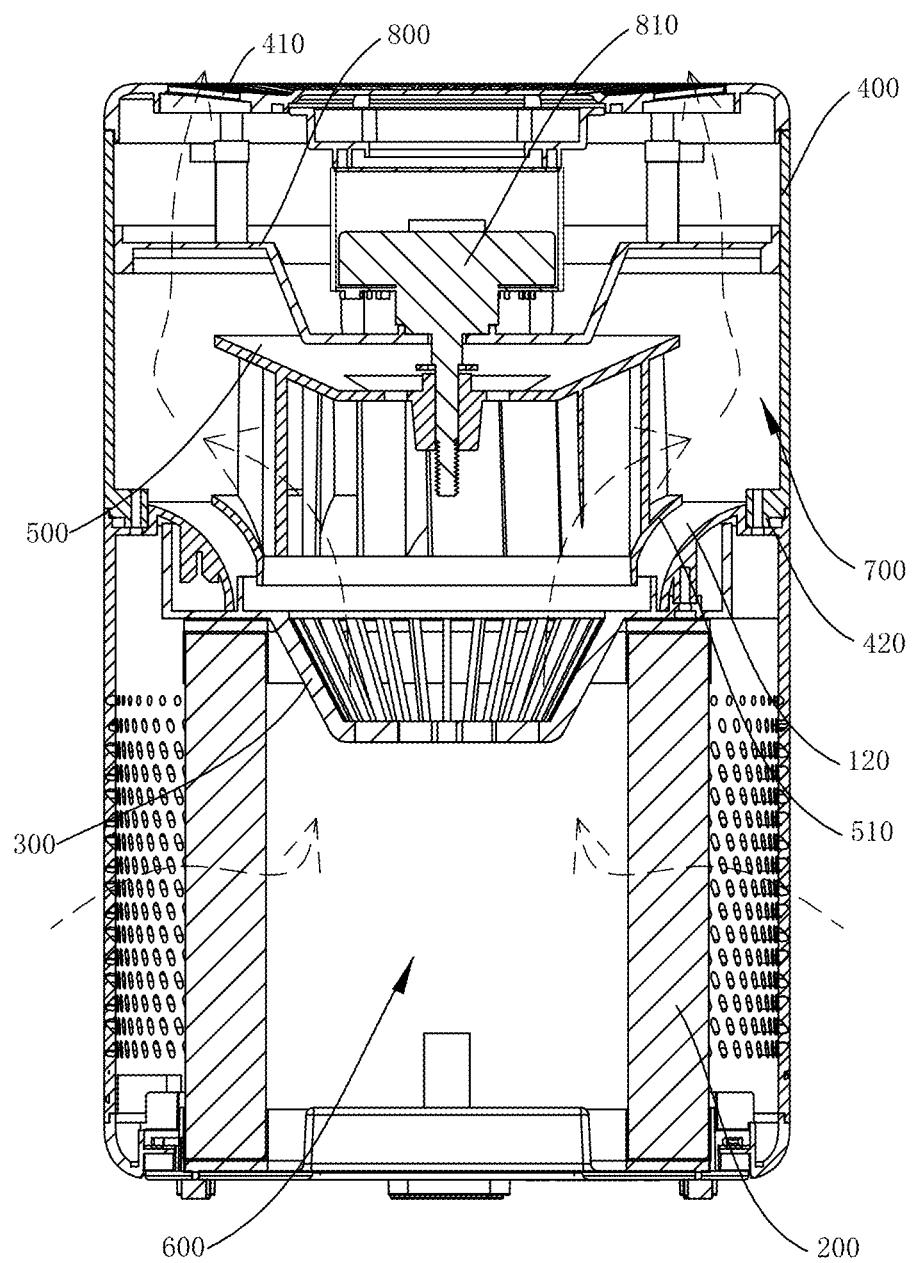
FIG. 2 is an in-sectional view along the lines A-A in FIG. 1.
Figure 6:
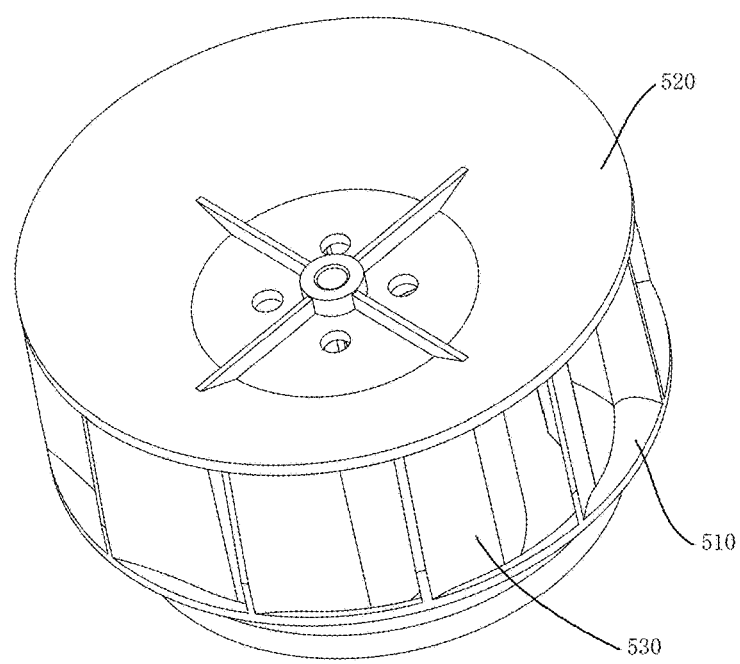
FIG. 6 is a perspective view of the wind wheel in the disclosure.

As shown in FIGS. 2 and 6, in an embodiment in the disclosure, a second guiding wall 510 is provided on the bottom of the wind wheel 500, the second guide wall 510 is in a ring shape, arranged around the circumferential direction of the wind wheel 500, and gradually inclines upward in the direction from its inner ring to the outer ring.

As shown in FIGS. 2 and 6, in an embodiment in the disclosure, the second guide wall 510 has an arc-shaped surface that protrudes inwards to reduce the corners and maintain a smooth transition so that the airflow will not be obstructed when passing through the second guide wall 510, and thus the noise can be reduced.

Figure 3:
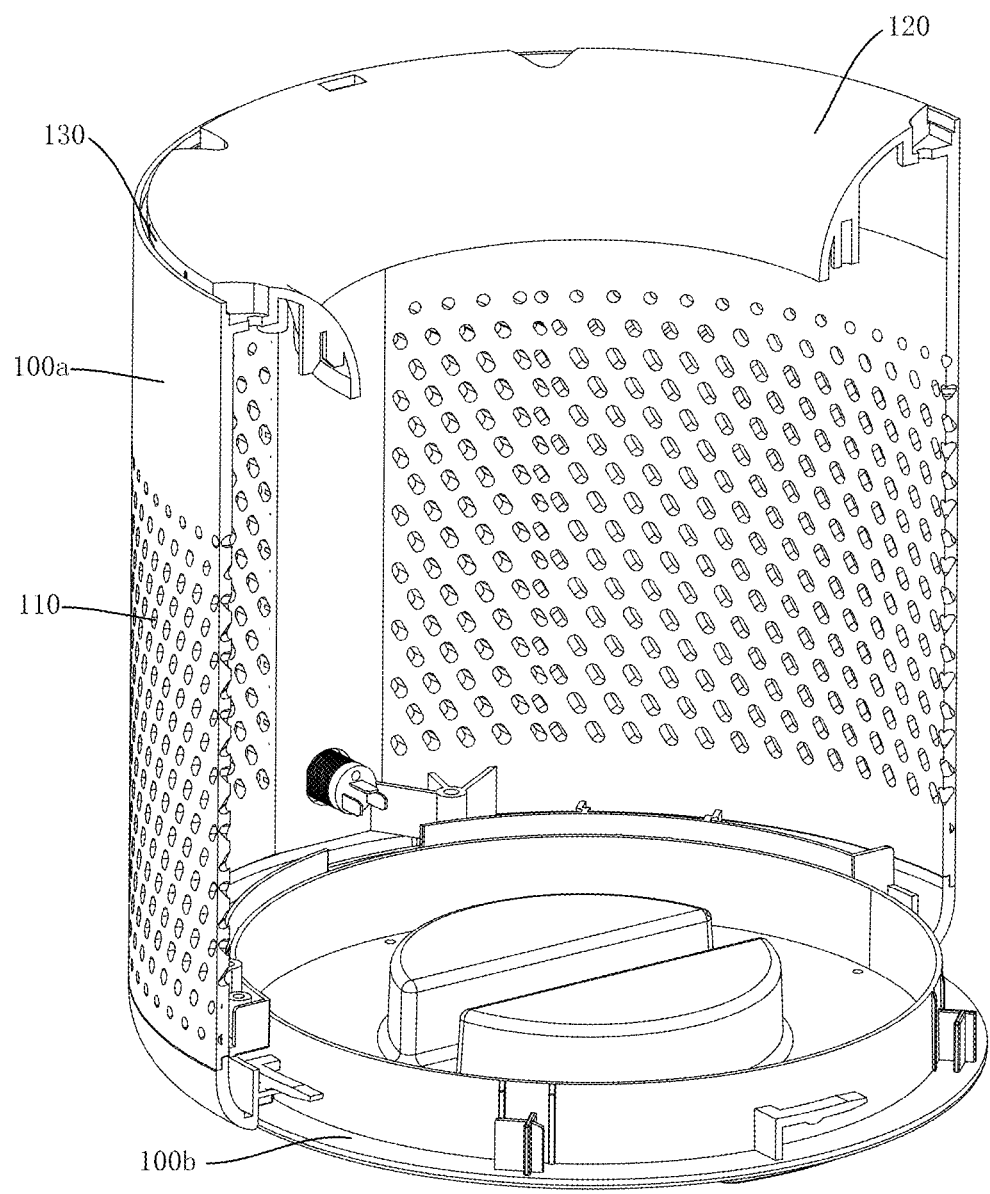
FIG. 3 is a sectional view of the lower housing in the disclosure.

As shown in FIGS. 2-3, in an embodiment in the disclosure, the first guide wall 120 extends toward the central direction of the lower housing 100 and gradually slopes downwards, that is, the first guide wall 120 is gradually inclined downward from the end connected to the lower housing 100 to the other end. The shape of the first guide wall 120 can cooperate with the shape of the bracket 300 and the shape of the upper housing 400 to form an air outlet channel 700, which saves the cost of additionally setting up an air duct. In addition, the first guide wall 120 is designed to have the same inclination direction and curvature as the second guide wall 510, which can avoid the second guide wall 510 and enable an equidistant flow channel to be formed between the first guide wall 120 and the second guide wall 510, preventing turbulence and noise when the airflow passes between the first guide wall 120 and the second guide wall 510.

In an embodiment in the disclosure, the radian a of the first guide wall is 30≤α≤45. When the arc of the first guide wall 120 is too small, it cannot smoothly guide the airflow to flow obliquely upward. When the arc of the first guide wall 120 is too large, it is not conducive to demolding during the injection-molding process.

As shown in FIGS. 2 and 6, in an embodiment, a third guide wall 520 is provided on the top of the wind wheel 500, and gradually slopes upwards from the center of the wind wheel 500 to the outside. Several blades 530 are arranged between the third guide wall 520 and the second guide wall 510. It can be understood that the third guide wall 520 and the second guide wall 510 can jointly form an obliquely upward guiding path, providing a smooth guide for the flow of the air current and preventing the air current from generating turbulence inside the wind wheel 500. Further, the number of blades 530 can be evenly arranged in an array around the axis of the wind wheel 500. In addition, the recessed installation position 830 on the motor bracket 800 has a structure that protrudes downward, which can fit with the third guide wall 520 that slopes upward.

As shown in FIG. 2, in an embodiment in this disclosure, the bottom surface of the first guide wall is fixed with the bracket 300 through fasteners. After the bracket 300 and the first guide wall 120 is completed, the lower housing 100 is integrated with the bracket 300. Further, the lower housing 100 may include a housing wall 100a and a bottom cover 100b. The first guide wall 120 can be arranged on the housing wall 100a. After the connection between the bracket 300 and the first guide wall 120 is completed, other components such as the filter element 200 can be further installed into the housing wall 100a. Finally, the bottom cover 100b is connected to the bottom surface of the housing wall 100a to seal the bottom surface of the housing wall 100a. In addition, the bottom end of the first guide wall 120 abuts against the upper surface of the bracket 300, which can prevent the airflow flowing into the air outlet channel 700 from flowing back into the air inlet channel 600.

Figure 4:
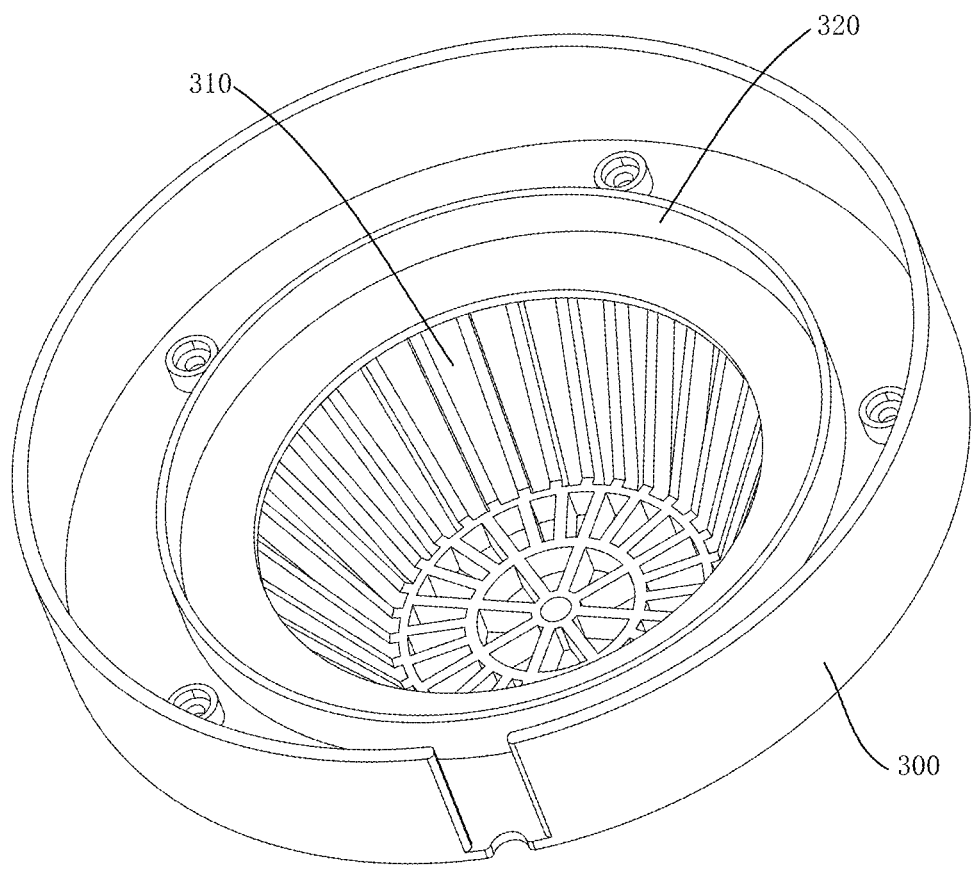
FIG. 4 is a perspective view of the bracket in the disclosure.
Figure 5:
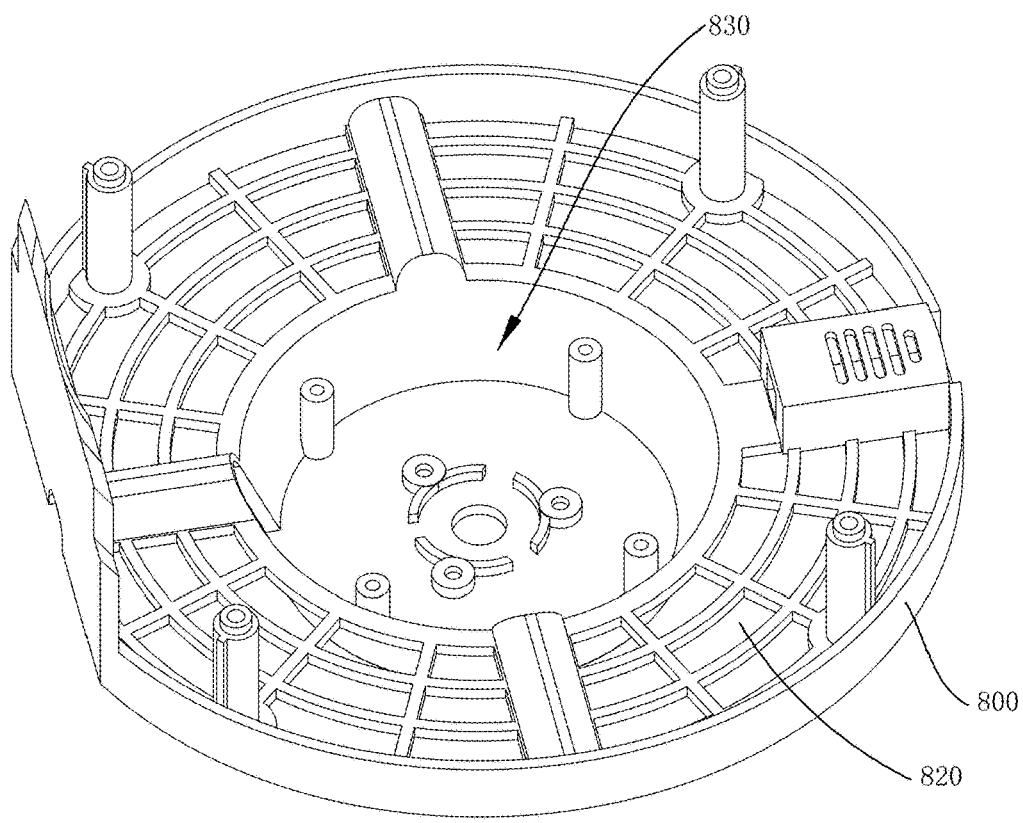
FIG. 5 is a perspective view of the motor bracket in the disclosure.

As shown in FIG. 4, in an embodiment in this disclosure, a stop rib 320 extends upward from the upper surface of the bracket 300. The stop rib 320 is in a ring shape and arranged around the axis of the bracket 300. The outer diameter of the stop rib 320 is smaller than the inner diameter of the first guide wall 120. During the process of installing the bracket 300 and the lower housing 100, the stop rib 320 can extend into the inner ring of the first guide wall 120, and the first guide wall 120 can provide assembly guidance for the installation of the bracket 300, therefore, the assembly efficiency can be further improved.

In an embodiment in this disclosure, the first guide wall 120 can be integrally formed with the lower housing 100, that is, the two have an integrated structure. Specifically, both the first guide wall 120 and the lower housing 100 can be made of plastic material and integrally injection-molded in the same mold.

As shown in FIGS. 2-3, in an embodiment in the disclosure, an annular groove 130 is formed on the upper surface of the lower housing 100, and an annular protrusion 420 is provided on the lower surface of the upper housing 400. The annular protrusion 420 can be inserted into the annular groove 130 to achieve the alignment between the lower housing 100 and the upper housing 400. Then, the two can be connected to each other through fasteners such as bolts.

It should be noted that the direction of the dotted-line arrow in FIG. 2 is a schematic indication of the approximate path of the external air after it enters the interior of the air purifier.

The above content is a further detailed description of the disclosure in combination with specific preferred embodiments, and it cannot be considered that the specific implementation of the disclosure is only limited to these descriptions. For those of ordinary skill in the technical field to which the disclosure belongs, without departing from the concept of the disclosure, the structural form can be flexibly changed, and a series of derivative products can be developed. As long as several simple deductions or substitutions are made, they should all be regarded as falling within the scope of the patent protection of the disclosure determined by the submitted claims.

What is claimed is:

1. An air purifier, comprising:
a lower housing, a surf ace thereof is provided with a plurality of air inlets, an interior thereof is mounted with an annular filter element extending in a vertical direction, and an upper part thereof extends inwards to form an annular first guide wall; wherein the lower housing comprises a housing wall and a bottom cover; an annular groove is formed on an upper surface of the lower housing and is arranged on the housing wall;
an annular filter element extending in an axial direction perpendicular to the upper surface of the lower housing and further installed into the housing wall;
a bracket, located at an upper end of the filter element, the bracket, and inner surface of the filter element, and a bottom wall of the lower housing together enclose an air inlet channel, the bracket is provided with a plurality of communication holes, wherein a bottom end of the first guide wall abuts against an upper surface of the bracket, which can prevent air flowing into an air outlet channel from flowing back into the air inlet channel;
a motor bracket, a driving motor is arranged thereon, several through holes are provided on a periphery of the motor bracket around the driving motor; a middle part of the motor bracket is recessed downward to form an installation position, the driving motor is placed at the installed position;
an upper housing, installed on the lower housing, and a top of the upper housing is provided with a plurality of air outlets; an annular protrusion is provided on a lower surface of the upper housing; wherein the annular protrusion is configured to be inserted into the annular groove to achieve an alignment between the lower housing and the upper housing;
a wind wheel, rotatably arranged inside the upper housing and coaxially arranged with the air inlet channel; the upper housing, the first guide wall and the bracket together enclose the air outlet channel; the motor is used to drive the wind wheel to rotate, the air inlet channel is communicated with the air outlet channel through the communication holes, and the air outlet channel is communicated with the air outlets, both ends of each through hole are communicated with the air outlet channel;

a second guide wall, provided on a bottom of the wind wheel, and arranged around the circumferential direction of the wind wheel and gradually inclines upward in the direction from an inner ring of the wind wheel to an outer ring of the wind wheel; the second guide wall has an arc-shaped surface that protrudes inwards;

a third guide wall, provided on a top of the wind wheel, and gradually slopes upwards from a center of the wind wheel to an outside; a plurality of blades is arranged between the third guide wall and the second guide wall along the axial direction perpendicular to the upper surface of the lower housing;

wherein the first guide wall extends toward a central direction of the lower housing and gradually slopes downwards, and the first guide wall has the same inclination direction and curvature as the second guide wall;

the third guide wall and the second guide wall jointly form an obliquely upward guiding path, providing a guide for a flow of an air current and preventing the air current from generating turbulence inside the wind wheel; and the number of blades is evenly arranged in an array around the axis of the wind wheel;

a flow path is formed as below: the air enters the lower housing from the air inlets, then is filtrated by the filter element, and enters the air inlet channel, then the air in the air inlet channel is driven by the wind wheel to enter into the air outlet channel through the communication holes, and expels out of the air outlets; and the first guide wall can be integrally formed with the lower housing, and both the first guide wall and the lower housing is made of plastic material and integrally injection-molded in a same mold.

2. The air purifier according to claim 1, wherein a bottom surface of the first guide wall is fixed with the bracket through fasteners.

3. The air purifier according to claim 2, wherein a stop rib extends upward from the upper surface of the bracket; an outer diameter of the stop rib is smaller than an inner diameter of the first guide wall.

* * * * *